United States Patent [19]

Dougier et al.

[11] 4,237,027
[45] Dec. 2, 1980

[54] NOVEL BLACK LIGHT EMITTING LUMINOPHORS

[75] Inventors: Patrick Dougier, Marly-le Roi; Claude Fouassier, Gradignan; Bertrand Latourrette, Gagny, all of France

[73] Assignee: Rhone-Poulenc Industries, Paris, France

[21] Appl. No.: 81,128

[22] Filed: Oct. 2, 1979

[30] Foreign Application Priority Data

Oct. 3, 1978 [FR] France ................................. 78 28184

[51] Int. Cl.$^3$ .............................................. C09K 11/46
[52] U.S. Cl. ....................... 252/301.4 H; 252/301.4 F
[58] Field of Search .................. 252/301.4 H, 301.4 F

[56] References Cited

U.S. PATENT DOCUMENTS

| | | | |
|---|---|---|---|
| 3,630,945 | 12/1971 | Hoffman | 252/301.4 H |
| 4,122,349 | 10/1978 | Fouassier et al. | 252/301.4 H |

FOREIGN PATENT DOCUMENTS

| | | | |
|---|---|---|---|
| 43-27736 | 11/1968 | Japan | 252/301.4 F |
| 45-37299 | 11/1970 | Japan | 252/301.4 F |
| 46-3447 | 1/1971 | Japan | 252/301.4 F |

*Primary Examiner*—Jack Cooper
*Attorney, Agent, or Firm*—Burns, Doane, Swecker & Mathis

[57] ABSTRACT

Hydrated strontium fluosilicates activated with divalent europium, having the formula:

$$Sr_{1-x}Eu_x^{2+}SiF_6 \cdot 2H_2O$$

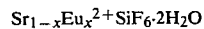

wherein $0 < x \leq 0.5$, are novel luminophors which emit black light.

3 Claims, 4 Drawing Figures

NOVEL BLACK LIGHT EMITTING LUMINOPHORS

BACKGROUND OF THE INVENTION

1. Field of the Invention

The present invention relates to novel hydrated strontium fluosilicates which are activated with divalent europium and are useful as black light emitting luminescent materials.

2. Description of the Prior Art

Divalent europium is a well known activator for luminescent materials and it typically produces wide band emission in the visible or in the near ultraviolet regions of the spectrum. However, compounds activated with divalent europium and which exhibit a narrow band in the near ultraviolet region have already been proposed to this art. Thus, the U.S. Pat. No. 3,630,945 describes alkaline earth fluoaluminates which are activated with divalent europium and which exhibit a sharp line ultraviolet emission spectrum which is characteristic of 4f to 4f energy level transitions. Nonetheless, this spectrum exhibits the disadvantage of a broadening of the base of the emission peak which results from an emission which is due to 5d and 4f transitions. This proves to be troublesome for any application requiring a spectral separation of a very narrow emission.

And in U.S. Pat. No. 4,122,349, assigned to the assignee hereof, there are disclosed novel luminophors having high fluorescent intensity, and characterized by a sharp line spectrum having a very narrow peak in the near ultraviolet region. Such luminophors are anhydrous alkaline earth metal fluosilicates activated with divalent europium and corresponding to the general forumla $M_{1-x}Eu_x{}^{2+}SiF_6$ wherein M is a member selected from the group consisting of strontium, barium and mixtures thereof, and wherein $0 < x \leq 0.2$.

SUMMARY OF THE INVENTION

It has now surprisingly been found that the subject, hydrated strontium fluosilicates, when activated with divalent europium, display a fluorescent intensity characterized by a sharp line emission spectrum having a very narrow peak in the near ultraviolet region, such fluorescence being even greater than that emitted by the luminophors featured in the noted U.S. Pat. No. 4,122,349.

Further objects, features and advantages of the present invention will become apparent from the detailed description of the invention which follows, when considered together with the accompanying Figures of Drawing.

DETAILED DESCRIPTION OF THE INVENTION

Figure 1:
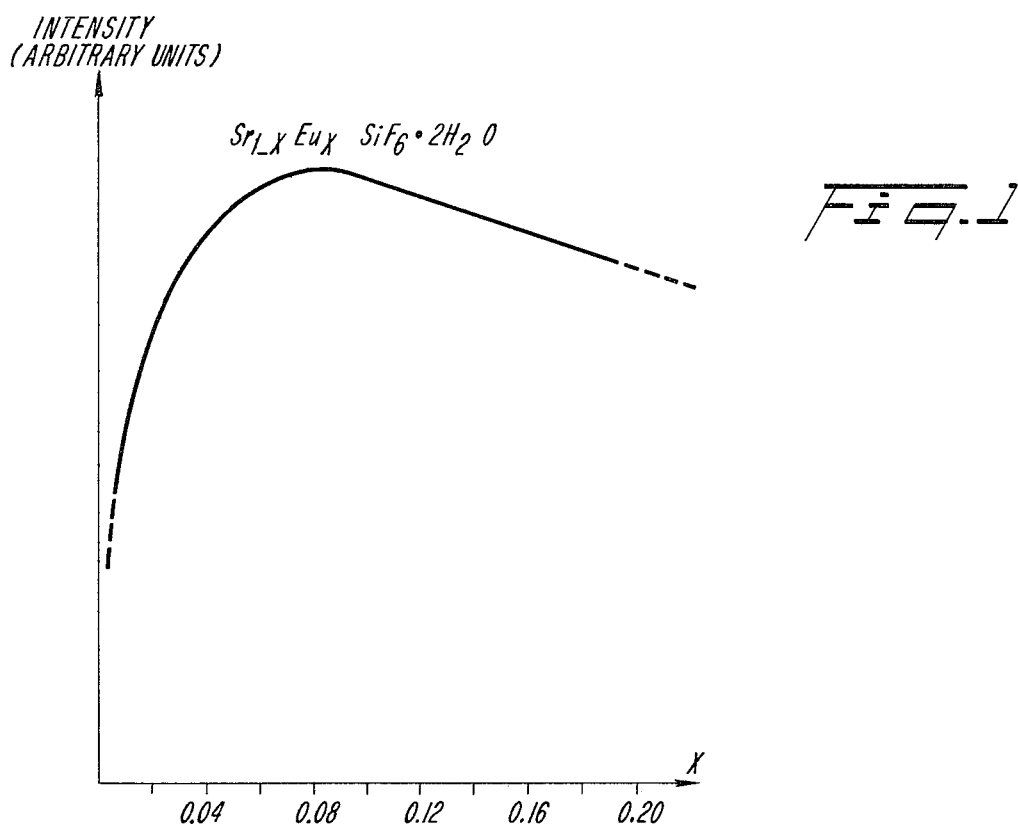
FIG. 1 is a graph illustrating the relationship existing between the intensity of emission and the value of x for a novel luminophor according to the invention.

More particularly, the present invention features formula $Sr_{1-x}Eu_xSiF_6 \cdot 2H_2O$, wherein $0 < x \leq 0.5$. The molar proportion x of divalent europium in the luminescent compounds of the present invention is thus greater than zero and less than, or equal to, 0.5 and, preferably, is between 0.04 and 0.16. Indeed, a determination of the influence of the proportion of the amount of divalent europium on the intensity of the emission reflects that the optimum value of x is approximately 0.08. The curve illustrating variation in emission intensity as a function of x is shown in FIG. 1.

The luminescent materials of the subject invention are prepared from the hydrated strontium fluosilicates, $SrSiF_6 \cdot 2H_2O$, by replacing a portion of the strontium ions by divalent europium ions; the hydrated strontium fluosilicates according to the invention crystallize in the orthorhombic system with the parameters $a = 6.75$ Å, $b = 7.95$ Å, $c = 10.80$ Å and the space group Pnma.

The luminescent materials of the invention have a very high fluorescent intensity under excitation by ultraviolet radiation. The excitation spectra shown in FIG. 2 indicate that the wavelength of excitation may be selected from between 2200 Å and 3400 Å, preferably in the vicinity of 2537 Å.

Figure 2:
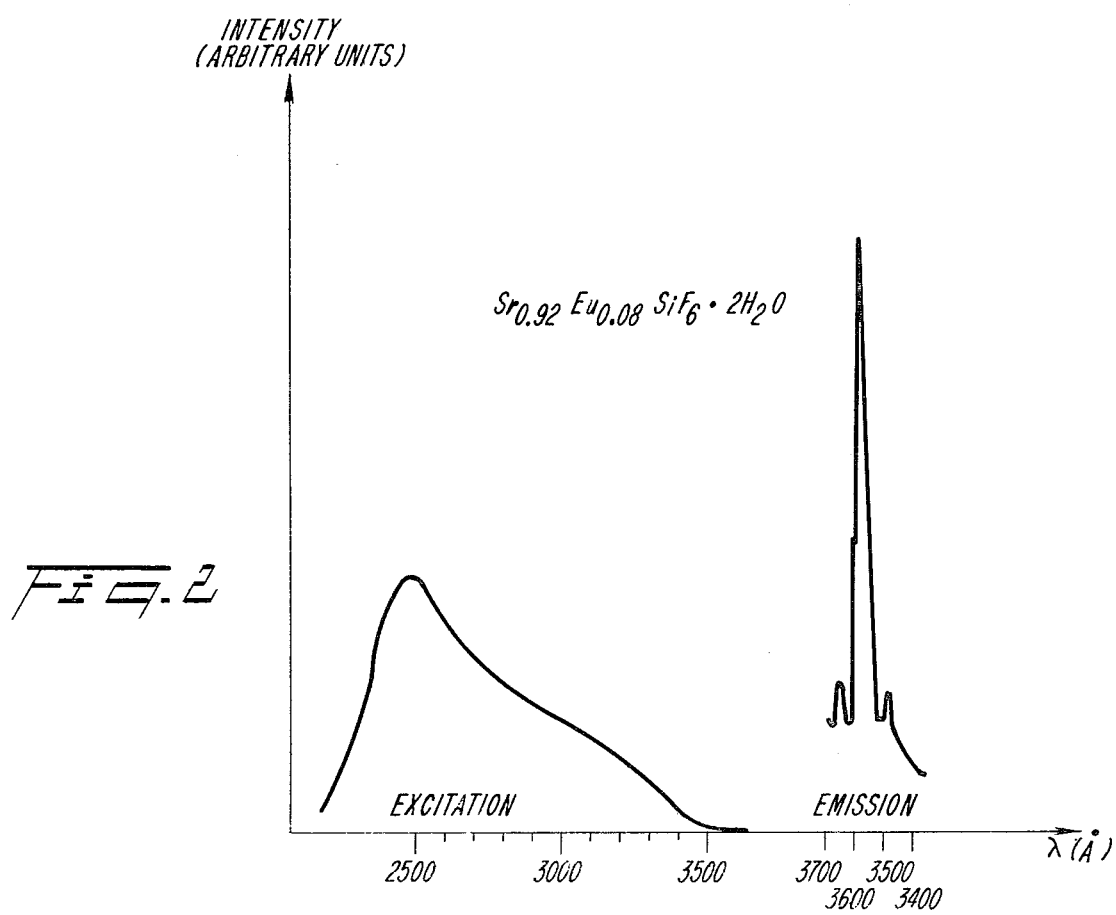
FIG. 2 is a spectrum reflecting the relationship between the intensity and the wavelength of excitation and emission for the luminophor according to the invention having the formula $Sr_{0.92}Eu_{0.08}SiF_6 \cdot 2H_2O$.
Figure 3:
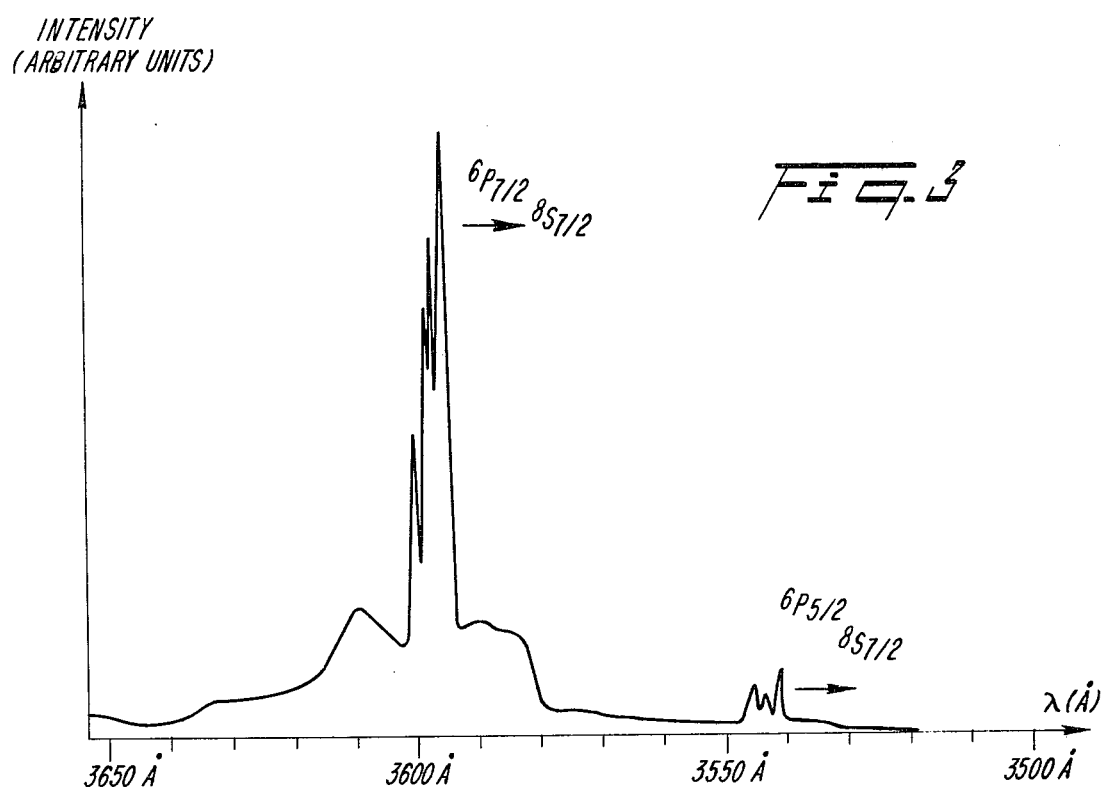
FIG. 3 is a more detailed spectrum reflecting the relationship between intensity and the wavelength of emission for the luminophor according to the invention having the formula $Sr_{0.92}Eu_{0.08}SiF_6 \cdot 2H_2O$.

The emission spectrum of the materials of the invention is also depicted in FIG. 2. Same reflects a very narrow spectral distribution (3500 Å–3700 Å) consisting of sharp lines, the most intense of which are centered at about 3600 Å. Analysis of this radiation by means of a high resolution monochromator shows that it actually comprises four components associated with the transitions originating in the first $^6P_{7/2}$ excitation level of the $4f^7$ configuration of divalent europium; their maxima are located at about 3594 Å, 3595 Å, 3597 Å, 3599 Å (FIG. 3); same are shifted slightly toward longer wavelengths vis-a-vis those of the materials described in the U.S. Pat. No. 4,122,349. The spectrum of FIG. 3 also shows an emission of lower intensity associated with transitions issued at the level $^6P_{5/2}$ of divalent europium.

Excitation is effected by absorption of incident UV radiation by the $4f^6 5d^1$ followed by a non-radiating transfer to the $^6P_J$ levels, located for the materials of the invention slightly below the $4f^6 5d^1$.

The luminophors of the invention are conveniently prepared by utilizing methods typically employed for the preparation of fluosilicates and, in particular, by reaction between a solution of hexafluosilicic acid, $H_2SiF_6$, and hydroalcoholic solutions of strontium and divalent europium.

A preferred technique for preparing the luminosphors of the invention comprises:

[i] An aqueous solution of a europium compound, such as the oxides, salts (nitrates, hydroxides, carbonates, halides, and the like) is prepared;

[ii] An aqueous solution of a a strontium compound, such as a salt (carbonates, hydroxides, nitrates, halides, and the like) or an oxide, is also prepared;

[iii] The two solutions are mixed together;

[iv] To the aqueous mixture formed in this manner, a volume of alcohol, preferably equivalent to that of the aqueous solution, is added;

[v] The hydroalcoholic solution thus obtained is transferred to a Jones column to effect or to complete the reduction of the europium to the divalent state;

[vi] The solution issuing from the Jones column is precipitated by an at least stoichiometric amount of $H_2SiF_6$ and preferably an amount approximately 65% in excess of stoichiometric; and

[vii] The resultant precipitate is filtered and dried with the aid of an organic solvent such as ether, at a temperature less than 80° C., and preferably at ambient temperature.

According to another process embodiment of the invention, the hydroalcoholic solution may be directly prepared by simply dissolving a mixture of the europium compound and the strontium compound in a hydroalcoholic medium.

According to yet another embodiment, the luminophors of the invention may be prepared by precipitation, by means of an alcohol, an aqueous solution of hexafluorosilicic acid and of the compounds of strontium and divalent europium.

The hydrated strontium fluosilicates activated with divalent europium according to this invention may be used in all of the devices utilizing the production of black light, and especially for those applications requiring an intense emission of approximately 3600 Å, corresponding to black light; in particular, they are eminently well suited for discharge lamps to produce black light.

Photochemical reproduction of documents is one of the areas wherein black light is used. Copies of such documents can be obtained by exposing the original documents to radiation, the wavelength of which corresponds to the maximum sensitivity of the photosensitive paper, and thence directing the reflected or transmitted rays against the photosensitive paper. The luminescent materials of the present invention are especially suited for the hereinabove described application because they exhibit a narrow emission spectrum, wherein practically all the energy of the luminescence is emitted in the region of maximum sensitivity of the photosensitive papers.

As other utilizations of black light as are contemplated within the scope of this invention, there are mentioned, mineralogical field utilizations in prospecting for petroleum and uranium, the detection of mercury, the luminescence of precious stones; within the medical field, utilization for the examination of nails, hair, teeth, eyes and the skin, or of the nervous and circulatory systems, renal functions, and the surgery field. In the area of quality control and analysis, black light may be used in controlling and/or detecting and/or evaluating: welds and surface conditions, alimentary tract products, textile fibers, "invisible" markings on postal items, signature control [e.g., in philately], document falsifications, criminology, and the confidential marking of documents and placarding, usually to obtain special effects. In the field of scientific research, practical applications extend to the arts of microscopy, chromatography, spectophotometry and electrophoresis.

In order to further illustrate the present invention and the advantages thereof, the following specific examples of luminophor preparation are given, as are their omission spectra, it being understood that same are intended only as illustrative and in nowise limitative.

EXAMPLE 1

A compound having the formula $Sr_{1-x}Eu_xSiF_6.2H_2O$, with the value of x being 0.08, was prepared; same reflects maximum fluorescent intensity of the hydrated strontium fluosilicates, activated with divalent europium, according to the invention:

The starting materials were employed in the following proportions:

| Starting Materials | Amount |
|---|---|
| $SrCl_2 . 6 H_2O$ | 245.29 g |
| $Eu_2O_3$ (calcined for 3-4 hours at 900-1000° C.) | 14.08 g |
| $H_2SiF_6$ 31% (d = 1.29) | 550 cm$^3$ |

The preparation was as follows:

[i] The trivalent europium oxide was dissolved under the influence of 70 cm$^3$ concentrated HCl while being slightly heated (Solution 1);

[ii] The strontium chloride was dissolved in the minimum amount of distilled water, also while being slightly heated (Solution 2);

[iii] Solution 1 was poured into Solution 2 and a volume of approximately 500 cm$^3$ was obtained, to which 500 cm$^3$ of ethyl alcohol were added (hydroalcoholic Solution 3);

[iv] A column containing a zinc-mercury amalgam having a reserve volume of 1 liter (Jones column) was prepared. The column was carefully rinsed with water and a slight amount of water was maintained above the amalgam. The hydroalcoholic Solution 3 was transferred by decantation into the column, to reduce the europium to its divalent state;

[v] From the base of the column, the first 50 cm$^3$, constituting the dead volume (previously determined) of the column, were removed;

[vi] The solution was then dripped into suitable flask containing $H_2SiF_6$ which was placed under the column and thence suitably agitated.

Throughout the duration of the flow, flushing with a neutral gas (Ar) was provided at the outlet of the column, to prevent any reoxidation of the divalent europium.

The column reserve was next carefully rinsed with a 50/50 mixture of water and alcohol (approximately 60 cm$^3$), prior to withdrawal from the column of the remainder of the solution with 70 cm$^3$ alcohol, such that the pH was no longer acid at the base of the column.

The agitation and the inert gas protection were maintained throughout the entire duration of flow and were continued for a short period of time after precipitation of the fluosilicate.

266 g of a white precipitate were obtained, which were filtered, then rinsed with absolute ethyl alcohol and finally dried with ether.

The product was identified by radiocrystallographic analysis. Same crystallized in the orthorhombic system with the parameters a=6.75 Å, b=7.95 Å, c=10.80 Å and the space group Pnma.

Figure 4:
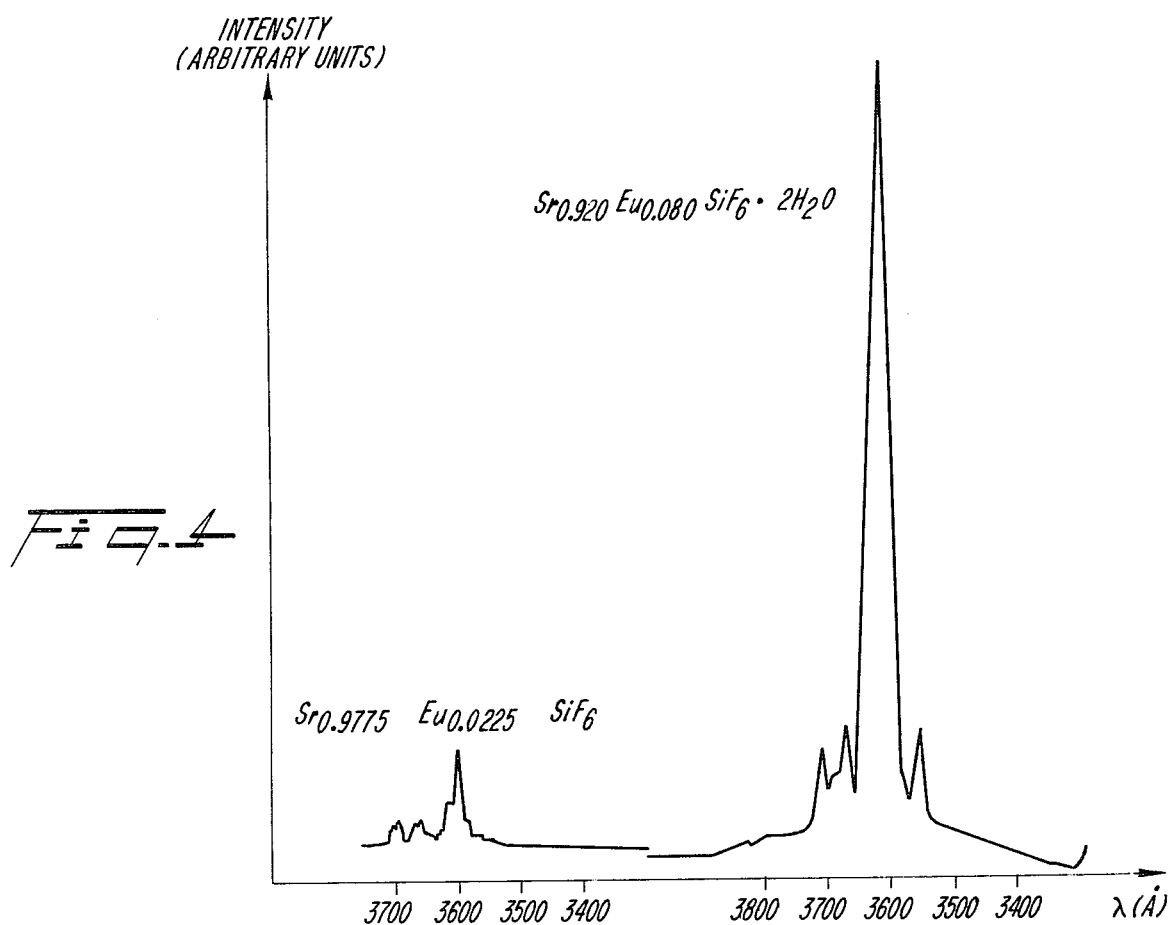
FIG. 4 is a spectrum comparing the relationship between intensity and wavelength of emission for both the luminophor according to the invention having the formula $Sr_{0.920}Eu_{0.080}SiF_6 \cdot 2H_2O$ and the prior art luminophor having the formula $Sr_{0.9775}Eu_{0.0225}SiF_6$.

The fluosilicate prepared in this manner emitted radiation with a peak at about 3600 Å, at ambient temperature and under ultraviolet excitation having a wavelength of 2537 Å, supplied by a deuterium lamp having a power of 100 watts. In comparison, the anhydrous alkaline earth fluosilicates featured in the U.S. Pat. No. 4,122,349 have a radiation spectrum with a maximum at about 3580 Å. A comparison of the emission spectra of $Sr_{0.92}Eu_{0.08}SiF_6.2H_2O$ and $Sr_{0.9775}Eu_{0.0225}SiF_6$, depicted in FIG. 4, demonstrates that the compounds of the present invention have a much more intense emission (8 to 9 times) than those of the prior art under the same conditions of excitation.

EXAMPLE 2

The compound describes in Example 1 was prepared, but by using the following starting materials in the proportions indicated:

| Starting Materials | Amount |
|---|---|
| SrCO$_3$ | 135.82 g |
| Eu$_2$O$_3$ (previously calcined 3-4 hours at 300–1000° C.) | 14.08 g |
| H$_2$SiF$_6$ 31% (d = 1.29) | 550 cm$^3$ |

The preparation was identical to that of Example 1 but the strontium carbonate was dissolved in the requisite volume of concentrated hydrochloric acid.

The luminescent material which resulted was identical to that of Example 1.

The radiocristallographic analysis gives the same results. Further the X-ray spectrum is the following.

| X ray diffraction spectrum of Sr$_{0.92}$Eu$_{0.08}$SiF$_6$:2 H$_2$O ||||||
|---|---|---|---|---|---|
| LINE | d (Å) | Intensity | LINE | d (Å) | INTENSITY |
| 1 | 6,46 | F | 26 | 2,12 | m |
| 2 | 5,79 | f | 27 | 2,11 | m |
| 3 | 5,45 | m | 28 | 2,10 | m |
| 4 | 4,67 | ff | 29 | 2,08 | mF |
| 5 | 4,23 | FF | 30 | 2,07 | mF |
| 6 | 3,97 | F | 31 | 2,06 | f |
| 7 | 3,37 | mF | 32 | 2,034 | mF |
| 8 | 3,27 | f | 33 | 2,028 | m |
| 9 | 3,26 | f | 34 | 2,00 | m |
| 10 | 3,21 | f | 35 | 1,99 | m |
| 11 | 3,20 | f | 36 | 1,98 | mF |
| 12 | 3,11 | ff | 37 | 1,92 | ff |
| 13 | 2,98 | mF | 38 | 1,86 | mF |
| 14 | 2,94 | mF | 39 | 1,85 | mF |
| 15 | 2,88 | mF | 40 | 1,83 | ff |
| 16 | 2,86 | f | 41 | | f |
| 17 | 2,69 | ff | 42 | | m |
| 18 | 2,55 | mF | 43 | 1,80 | f |
| 19 | 2,49 | ff | 44 | 1,79 | mF |
| 20 | 2,47 | m | 45 | 1,77 | mF |
| 21 | 2,39 | m | | | |
| 22 | 2,34 | mF | | | |
| 23 | 2,31 | mF | | | |
| 24 | 2,22 | mF | | | |
| 25 | 2,20 | m | | | |

F = strong;
f = weak;
m = medium;
mF = medium strong;
FF = very strong;
ff = very weak While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A luminophor having the formula:

$$Sr_{1-x}Eu_x^{2+}SiF_6.2H_2O,$$

wherein $0 < x \leq 0.5$ said luminophor emitting a sharp line emission spectrum centered at about 3600 Å when excited by ultraviolet radiation having a wavelength of 2537 Å.

2. The luminophor as defined by claim 1, wherein x is between 0.04 and 0.16.

3. The luminophor as defined by claim 2, wherein x is approximately 0.08.

* * * * *